(12) United States Patent
Calderone

(10) Patent No.: US 9,909,555 B2
(45) Date of Patent: Mar. 6, 2018

(54) UNDERWATER POWER GENERATION APPARATUS

(71) Applicant: John Calderone, Powell, OH (US)

(72) Inventor: John Calderone, Powell, OH (US)

( * ) Notice: Subject to any disclaimer, the term of this patent is extended or adjusted under 35 U.S.C. 154(b) by 271 days.

(21) Appl. No.: 14/679,191

(22) Filed: Apr. 6, 2015

(65) Prior Publication Data

US 2016/0290312 A1  Oct. 6, 2016

(51) Int. Cl.
| | |
|---|---|
| *F03B 7/00* | (2006.01) |
| *F03B 17/06* | (2006.01) |
| *F03B 11/02* | (2006.01) |
| *F03B 11/06* | (2006.01) |
| *F03B 13/26* | (2006.01) |

(52) U.S. Cl.
CPC ............ *F03B 17/061* (2013.01); *F03B 11/02* (2013.01); *F03B 11/06* (2013.01); *F03B 13/264* (2013.01); *F05B 2210/404* (2013.01); *F05B 2240/91* (2013.01); *F05B 2240/97* (2013.01); *F05B 2250/25* (2013.01); *F05B 2250/712* (2013.01); *Y02E 10/28* (2013.01)

(58) Field of Classification Search
CPC .. F03B 3/04; F03B 3/121; F03B 3/126; F03B 17/061; F03B 11/02; F03B 11/06; F03B 13/264; F03B 13/12; F03B 13/26; F05B 2240/242; F05B 2210/404; F05B 2240/91; F05B 2240/97; F05B 2250/25; F05B 2250/712; Y02E 10/28
USPC ........ 415/2.1, 3.1, 4.1, 4.3, 4.5, 72–75, 906, 415/908, 221, 222
See application file for complete search history.

(56) References Cited

U.S. PATENT DOCUMENTS

| | | | | |
|---|---|---|---|---|
| 622,474 | A | * | 4/1899 | Hoskin ...................... F04D 3/02 290/52 |
| 1,491,688 | A | * | 4/1924 | Ford ....................... F03D 1/025 180/7.4 |
| 2,652,505 | A | * | 9/1953 | Matheisel ................ B63H 5/14 290/54 |
| 2,929,937 | A | * | 3/1960 | Kroger ..................... F03B 3/04 290/52 |

(Continued)

FOREIGN PATENT DOCUMENTS

| | | |
|---|---|---|
| WO | 2007055585 A1 | 5/2007 |
| WO | 2010109169 A2 | 9/2010 |

*Primary Examiner* — Woody Lee, Jr.
*Assistant Examiner* — Brian Delrue
(74) *Attorney, Agent, or Firm* — Benesch Friedlander Coplan & Aronoff LLP; Thomas Y. Kendrick

(57) ABSTRACT

Various embodiments of an underwater power generation apparatus are provided. In one embodiment, an underwater power generation apparatus is provided, comprising: a conduit having a bore defined by an interior surface of the conduit, the bore comprising a void extending about a length of the conduit; an exterior cylinder, the conduit oriented within the exterior cylinder, and the conduit rotatable relative to the exterior cylinder; at least three bearings oriented between the conduit and the exterior cylinder; at least one blade having a first blade direction, the at least one blade having a first blade direction oriented on the interior surface of the conduit at a first end of the conduit; and at least one blade having a second blade direction, the at least one blade having a second blade direction oriented on the interior surface of the conduit at a second end of the conduit.

9 Claims, 10 Drawing Sheets

(56) References Cited

U.S. PATENT DOCUMENTS

| | | | | |
|---|---|---|---|---|
| 3,912,937 | A * | 10/1975 | Lesser | F03B 17/065 290/43 |
| 4,104,536 | A * | 8/1978 | Gutsfeld | F03B 17/063 290/54 |
| 4,272,685 | A * | 6/1981 | Toyama | F03B 13/06 290/52 |
| 4,686,376 | A * | 8/1987 | Retz | F03B 17/063 290/42 |
| 5,017,087 | A * | 5/1991 | Sneddon | F01D 15/08 415/221 |
| 5,333,996 | A * | 8/1994 | Bergstein | F03D 3/061 415/3.1 |
| 5,430,332 | A * | 7/1995 | Dunn, Jr. | F03B 7/00 290/43 |
| 7,044,711 | B2 * | 5/2006 | Duncan, Jr. | F03B 7/00 415/906 |
| 7,279,803 | B1 * | 10/2007 | Bosley | F03B 3/126 290/43 |
| 7,329,963 | B2 * | 2/2008 | Omer | F03B 17/066 290/43 |
| 8,134,246 | B1 * | 3/2012 | Lois | F03B 17/063 290/44 |
| 8,546,966 | B1 * | 10/2013 | Santos | F03B 11/002 290/43 |
| 9,512,816 | B2 * | 12/2016 | Ferguson | F03B 7/003 |
| 2003/0233143 | A1 * | 12/2003 | Gharib | A61F 2/86 623/3.1 |
| 2004/0195840 | A1 * | 10/2004 | Baarman | C02F 1/325 290/43 |
| 2005/0214109 | A1 * | 9/2005 | Grande, III | F01D 1/36 415/90 |
| 2007/0108768 | A1 * | 5/2007 | Dempster | F03B 17/063 290/42 |
| 2009/0167027 | A1 * | 7/2009 | Kato | F03D 3/02 290/55 |
| 2009/0179426 | A1 * | 7/2009 | Alvarez | F03B 11/02 290/54 |
| 2011/0006542 | A1 * | 1/2011 | Burrell, IV | F03D 3/049 290/55 |
| 2011/0057442 | A1 * | 3/2011 | Chauvin | F03B 17/063 290/43 |
| 2011/0206526 | A1 * | 8/2011 | Roberts | F03D 3/02 416/223 R |
| 2012/0306205 | A1 * | 12/2012 | Cosby | F03B 13/00 290/52 |
| 2014/0265335 | A1 * | 9/2014 | Andreis | B63B 1/32 290/52 |
| 2015/0076825 | A1 * | 3/2015 | Wyatt, II | H02K 7/1823 290/52 |

* cited by examiner

UNDERWATER POWER GENERATION APPARATUS

BACKGROUND

In the wake of ever-increasing population of the world, increases in industrial activities, and continuous addition of urban centers of developing countries to the power grid, the world's energy requirements are constantly rising. Traditionally, energy is generated through the combustion of fossil fuels, reaction of nuclear elements, wind, solar, and the like.

However, many of these energy sources have serious drawbacks. For example, fossil fuels require energy to obtain, for example via mining or drilling, and often create excessive environmental pollution. Nuclear energy includes inherent risks, such as reactor failures and nuclear waste contamination of soil, water, and the like. Wind energy requires placement of windmills in areas having certain minimum wind values, which not only pose a threat to birds, but also tend to detract from the landscape views. Solar energy requires placement of panels in areas having certain minimum sunshine values, which takes up significant amounts of space and tends to detract from landscape views.

An alternative to these energy generation systems may include the placement of underwater power generators in currents, such as tidal currents. These generators may include a rotatable conduit configured to accept a flow of water, which flow may cause the conduit to rotate. The conduit may be coupled to an electrical generator, which converts the mechanical energy of the rotating conduit into electrical energy. However, these systems have drawbacks, particularly in that the system only generates electricity when the conduit rotates a certain direction. As such, each conduit unit in these systems may only be able to harness energy of the water as it flows one direction or the other, for example during one of the flood current and the ebb current. As tidal currents change direction through the day, each unit generates electricity only a portion of the day, when the tide is flowing the direction necessary to cause that unit's conduit to rotate a specific direction.

What is needed is an underwater power generation apparatus configured to capture tidal currents during both the flood current and the ebb current.

SUMMARY

In one embodiment, an underwater power generation apparatus is provided, the apparatus comprising: a conduit having a bore defined by an interior surface of the conduit, the bore comprising a void extending about a length of the conduit; an exterior cylinder, wherein the conduit is oriented within the exterior cylinder, and wherein the conduit is rotatable relative to the exterior cylinder; at least three bearings oriented between the conduit and the exterior cylinder; at least one blade having a first blade direction, the at least one blade having a first blade direction oriented on the interior surface of the conduit at a first end of the conduit; and at least one blade having a second blade direction, the at least one blade having a second blade direction oriented on the interior surface of the conduit at a second end of the conduit.

In another embodiment, an underwater power generation apparatus is provided, the apparatus comprising: a conduit having a bore defined by an interior surface of the conduit, the bore comprising a void extending about a length of the conduit; an exterior cylinder, wherein the conduit is oriented within the exterior cylinder, and wherein the conduit is rotatable relative to the exterior cylinder; at least three bearings oriented between the conduit and the exterior cylinder; at least one blade having a first blade direction, the at least one blade having a first blade direction oriented on the interior surface of the conduit at a first end of the conduit; and at least one blade having a second blade direction, the at least one blade having a second blade direction oriented on the interior surface of the conduit at a second end of the conduit, wherein the at least one blade having a first blade direction has a concave surface oriented toward the first end of the conduit, and wherein the at least one blade having a second blade direction has a concave surface oriented toward the second end of the conduit.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

A fluid, such as water, flowing through a conduit having a specified shape, helical blades, helical grooves, and the like, may produce a rotational vortex. Rotational vortices of fluid in a conduit may result in a reduction of the fluid's pressure loss caused by friction between the fluid and the interior of the conduit. A vortex flow of a fluid may be utilized to decrease the friction of the fluid with a conduit and thus increase flow of the fluid through the conduit.

A fluid flowing through a conduit having a constricted portion following an expanded portion may be subject to the Venturi effect. The Venturi effect may act to increase velocity of a fluid in the constricted portion of the conduit, while lowering the pressure of the fluid in the constricted portion of the conduit.

Figure 1:
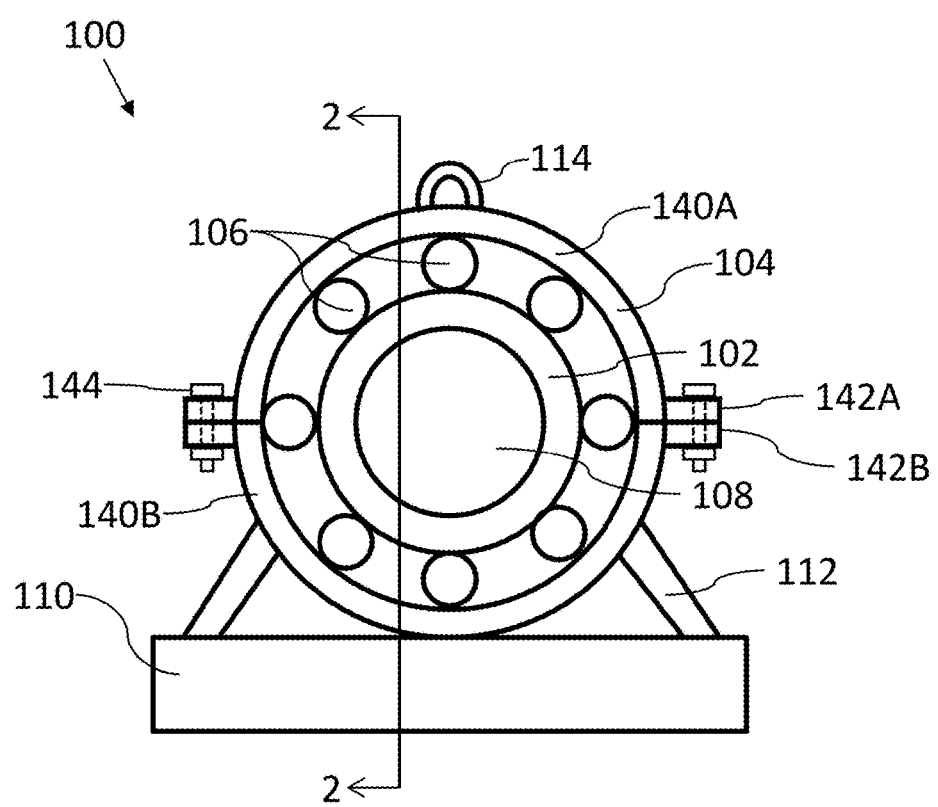
FIG. 1 illustrates a front elevation view of an example embodiment of an underwater power generation apparatus.

FIG. 1 illustrates an example embodiment of an underwater power generation apparatus 100. Apparatus 100 may include a conduit 102, an exterior cylinder 104, and at least one bearing 106. Conduit 102 may include a bore 108, which may be a void extending about its length. Apparatus 100 may include a base 110. Apparatus 100 may include at least one support member 112. Apparatus 100 may include at least one lifting eye 114.

Apparatus 100 may include a device for transforming mechanical energy to electrical energy, including for example a generator (not shown). Apparatus 100 may be operatively connected to a device for transforming mechanical energy to electrical energy, including for example a generator (not shown). Apparatus 100's conduit 102 may be operatively connected to a device for transforming mechanical energy to electrical energy, including for example a generator (not shown). Conduit 102 may be directly connected to a device for transforming mechanical energy to electrical energy, including for example a generator (not shown). Conduit 102 may be operatively connected to a device, such as a generator, through any of a variety of connections, including a direct connected, a pulley system including a belt or chain, a gear train, and the like.

Conduit 102 may be rotatable relative to the remainder of apparatus 100. Conduit 102 may be rotatable about its central axis relative to the remainder of apparatus 100. Conduit 102 may include a substantially cylindrical tube. Conduit 102 may include a substantially circular cross-section. Conduit 102 may include a hollow tube shaped substantially cylindrically.

Bore 108 may extend completely through conduit 102, such that conduit 102 is substantially hollow. Bore 108 may be substantially cylindrical in shape, having a similar diameter at each point along its length. Bore 108 may be substantially hourglass-shaped, having a diameter that is greater near its first and second ends, and lesser near its central portion. Bore 108 may decrease in diameter from a first end to a central region, where it's diameter may be constant for a length, and increase in diameter from the central region to a second end. Bore 108 may include a constriction substantially similar to a Venturi tube. Bore 108 may be substantially conical in shape, with a diameter that decreases from a first end to a second end. Bore 108 may be substantially conical in shape, with a diameter that increases from a first end to a second end. Bore 108 may be defined by an interior surface of conduit 102.

Conduit 102 may be oriented substantially within exterior cylinder 104. Exterior cylinder 104 may be substantially cylindrical in shape. Exterior cylinder 104 may be substantially hollow to receive conduit 102. Exterior cylinder 104 may be oriented substantially about conduit 102. Exterior cylinder 104 may have an inner diameter that is greater than the outer diameter of conduit 102. Exterior cylinder 104 and conduit 102 may be substantially concentric.

Conduit 102 may include a device to store rotational energy, including for example a flywheel.

At least one bearing 106 may be oriented between conduit 102 and exterior cylinder 104. Three bearings 106 may be oriented between conduit 102 and exterior cylinder 104. Three or more bearings 106 may be oriented between conduit 102 and exterior cylinder 104. Four or more bearings 106 may be oriented between conduit 102 and exterior cylinder 104.

At least one bearing 106 may be a ball bearing. At least one bearing 106 may be a roller bearing. At least one bearing 106 may include any of a variety of bearing types.

Exterior cylinder 104 may be formed as a single, complete element. Exterior cylinder 104 may be formed from a plurality of individual sections. Exterior cylinder 104 may be formed from two or more individual sections. The individual sections may be substantially complete about their length, such that when assembled they form exterior cylinder 104. That is, the individual sections may each extend completely about the length of apparatus 100. Alternatively, the individual sections may extend partially about the length of apparatus 100, such that additional individual sections may be connected to completely extend about the length of apparatus 100.

In one embodiment, exterior cylinder 104 may be formed from two individual sections, 140A and 140B. Exterior cylinder 104 may be formed from an upper section 140A and a lower section 140B. Upper section 140A may include at least one flange 142A. Lower section 140B may include at least one flange 142B. At least one fastener 144 may selectively connect at least one flange 142A to at least one flange 142B. At least one fastener 144 may include any of a variety of fasteners, including fasteners that are selectively removable, or permanent fasteners. Example fasteners 144 include, without limitation: a bolt, a bolt and nut, a rivet, a pin, a weld, an adhesive, a clamp, and the like.

Base 110 may be any of a variety of devices capable of maintaining apparatus 100 in a substantially fixed position. Base 110 may include a weighted element, such as a large section of cement, metal, stone, or the like, configured to hold apparatus 100 in place similar to an anchor. Alternatively, base 110 may comprise an ocean floor, bed rock, soil, or the like, such that apparatus 100 is fixed to the earth in a substantially fixed position.

Exterior cylinder 104 may be attached to base 110 through any of a variety of ways, including for example via at least one support member 112. Exterior cylinder 104 may be attached to base 110 by at least one support member 112. At least one support member 112 may be a metallic member, including a metallic tubing, metallic angle iron, metallic I-beam, or the like. At least one support member 112 may extend into base 110, especially where base 110 is cement.

Apparatus 100 may include at least one lifting eye 114. At least one lifting eye 114 may include an element attached to apparatus 100 for any of a variety of reasons, including to allow one to lift apparatus 100 from the water, allow one to place apparatus 100 into water, load apparatus 100 onto a vehicle, further anchor apparatus 100 into place, and the like. At least one lifting eye 114 may be oriented in any of a variety of positions on apparatus 100, including for example, in the center of its length, above its centroid, about its center of gravity, at each end of its length, and the like. At least one lifting eye 114 may include a loop, hook, boss, or the like configured to allow one to attach a lifting device (e.g., a crane) to apparatus 100.

In practice, one may need to replace worn parts, including at least one bearing 106, conduit 102, and the like. To do so, one may remove at least one fastener 144 and separate upper section 140A from lower section 140B. One may remove at least one bearing 106 and/or conduit 102, and replace either as needed. One may then replace upper section 140A upon lower section 140B and reattach at least one fastener 144.

In one embodiment, apparatus 100 and any of its various components, including conduit 102, exterior cylinder 104, and at least one bearing 106, may be formed from any of a variety of materials, including for example: a metal, an alloy, a polymer, a ceramic, a carbon fiber, a fiberglass, a composite, and the like.

Figure 2A:
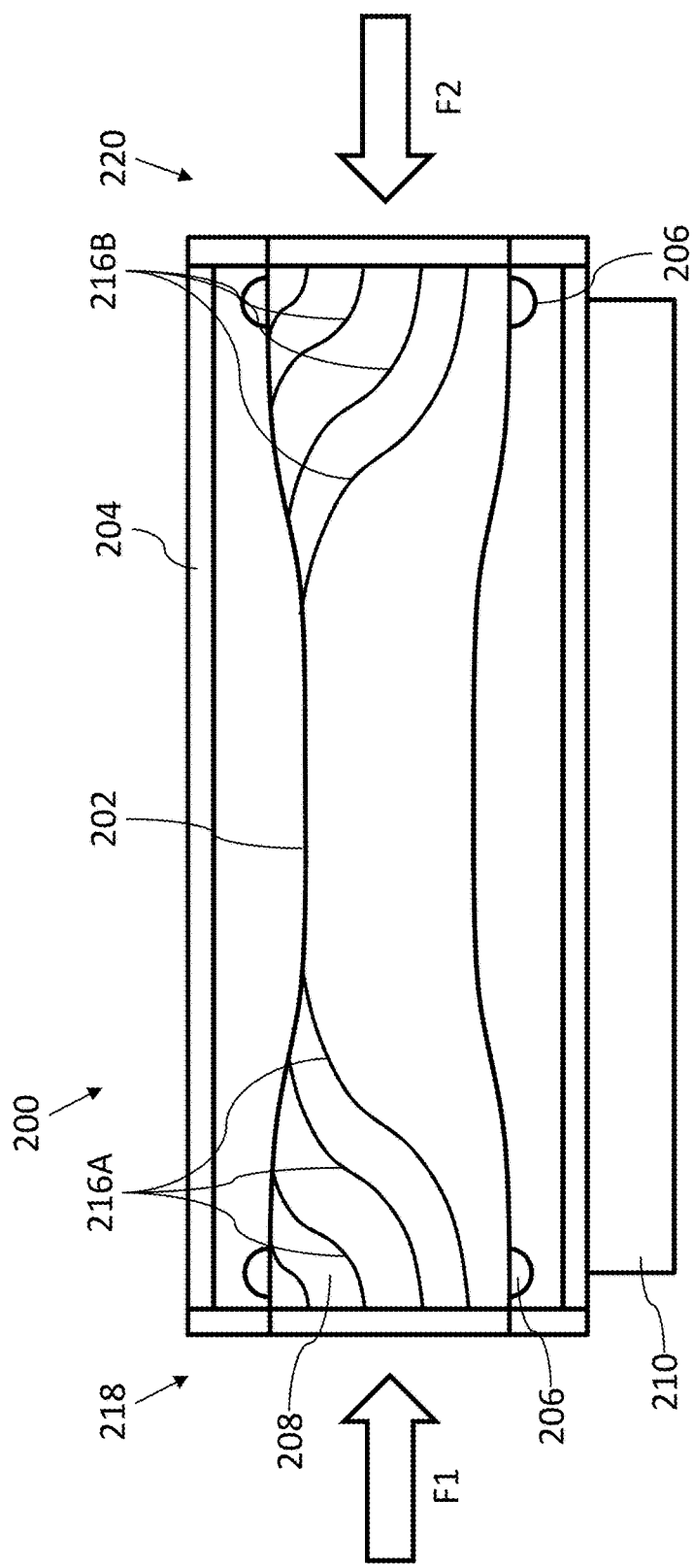
FIG. 2A illustrates a sectional view of an example embodiment of an underwater power generation apparatus 200 taken about section 2-2 illustrated in FIG. 1.

FIG. 2A illustrates a sectional view of an example embodiment of an underwater power generation apparatus 200 taken about section 2-2 illustrated in FIG. 1. Apparatus 200 may include a conduit 202, an external cylinder 204, and at least one bearing 206. Conduit 202 may include a bore 208. Apparatus 200 may include a base 210.

The interior of conduit 202 may include at least one blade 216A, 216B. Blades 216A may be oriented near a first end 218 of apparatus 200. Blades 216B may be oriented near a second end 220.

Blades 216A may have a first blade direction. The first blade direction may be oriented near first end 218. A first fluid flow F1 may be introduced to bore 208 at first end 218. Fluid flow F1 may be a flow of a liquid, such as water. Fluid flow F1 may be a flow of a fluid, such as at least one of water, air, and the like. Fluid flow F1 may engage blades 216A having a first blade direction, thus causing rotation of conduit 202 in a first direction about its central axis.

Blades 216B may have a second blade direction. The second blade direction may be oriented near second end 220. A second fluid flow F2 may be introduced to bore 208 at second end 220. Fluid flow F2 may be a flow of a liquid, such as water. Fluid flow F2 may be a flow of a fluid, such as at least one of water, air, and the like. Fluid flow F2 may engage blades 216B having a second blade direction, thus causing rotation of conduit 202 in a first direction about its central axis. Fluid flow F1 and fluid flow F2 may each cause rotation of conduit 202 in a first direction, which is the same direction.

As illustrated, conduit 202 may have a constricted center portion having a smaller diameter than the more open end portions. The constricted center portion of conduit 202 may include no blades 216A, 216B. In one embodiment, the center portion of conduit 202 may include blades 216A, 216B.

Figure 2B:
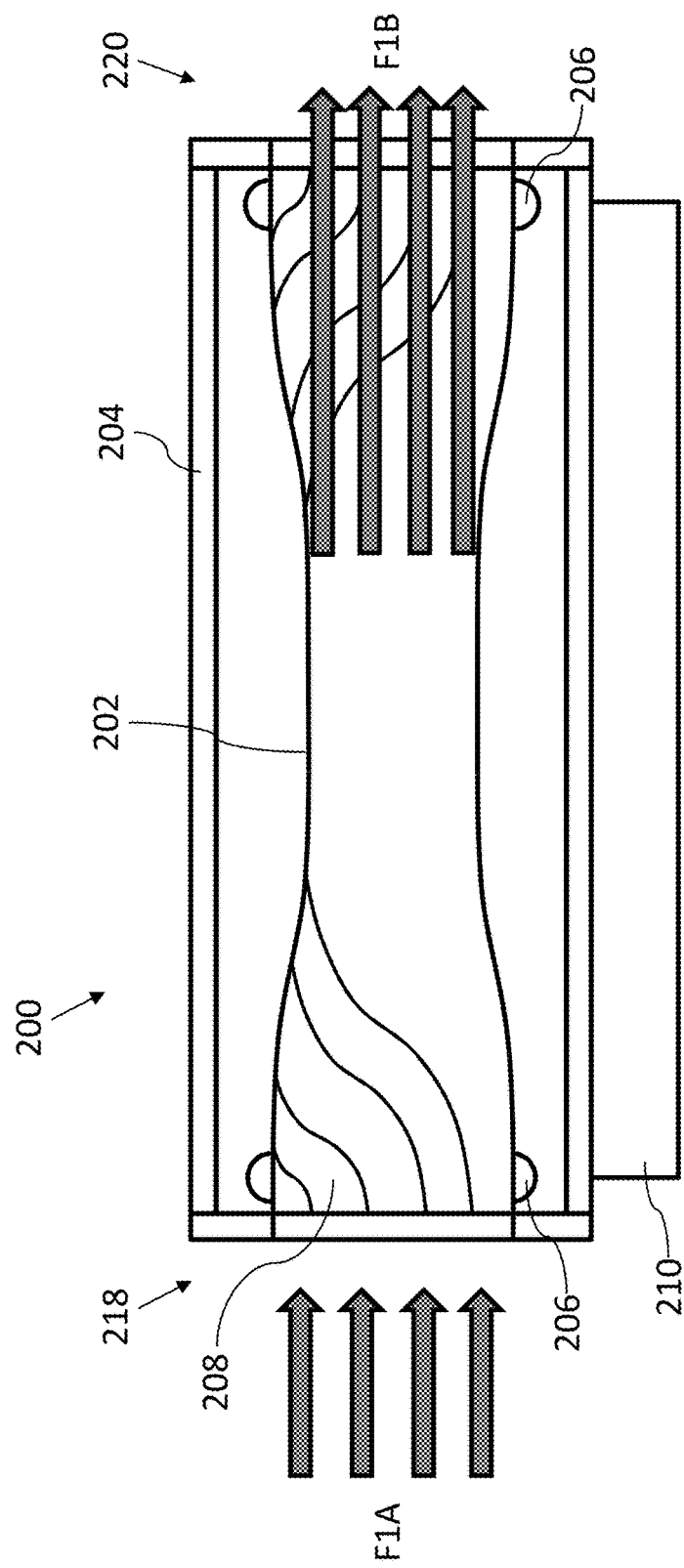
FIG. 2B illustrates a sectional view of an example embodiment of underwater power generation apparatus 200 taken about section 2-2 illustrated in FIG. 1.

FIG. 2B illustrates a sectional view of an example embodiment of underwater power generation apparatus 200 taken about section 2-2 illustrated in FIG. 1.

An entry fluid flow F1A may enter bore 208 at first end 218. An exit fluid flow F1B may exit bore 208 at second end 220. As illustrated, entry fluid flow F1A may have a diameter similar to that of bore 208 at first end 218. Exit fluid flow F1B may have a diameter similar to that of the constricted center portion of conduit 202. In this manner, entry fluid flow F1A may fully engage blades 216A and exit fluid flow F1B may substantially pass by blades 216B without fully engaging blades 216B.

Figure 3A:
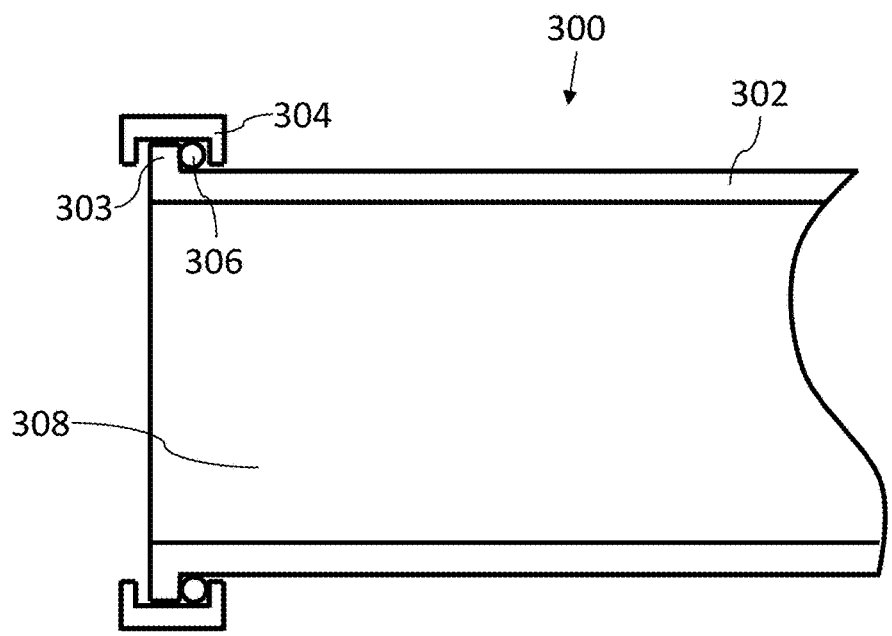
FIG. 3A illustrates a partial sectional view of an example embodiment of an underwater power generation apparatus 300.

FIG. 3A illustrates a partial sectional view of an example embodiment of an underwater power generation apparatus 300. Apparatus 300 may include a conduit 302, an exterior cylinder 304, and at least one bearing 306. Conduit 302 may include a bore 308.

In this embodiment, exterior cylinder 304 may not extend completely along the length of conduit 302, but rather, may be isolated to one or both ends of conduit 302.

Conduit 302 may include an enlarged exterior rib 303. Rib 303 may be configured to fit within the dimensions of exterior cylinder 304, such that exterior cylinder 304 encloses rib 303. Rib 303's engagement with exterior cylinder 304 may keep conduit 302 in place relative to exterior cylinder 304.

At least one bearing 306 may be oriented between rib 303 and exterior cylinder 304. The opposite end of apparatus 300 (not shown) may be a similar design as the illustrated end, but reversed 180 degrees.

Rib 303 may include a substantially radial side portion configured to engage at least one bearing 306. At least one bearing may engage one or more portion of exterior cylinder 304 that is parallel to the radial direction, axial direction, or both.

Figure 3B:
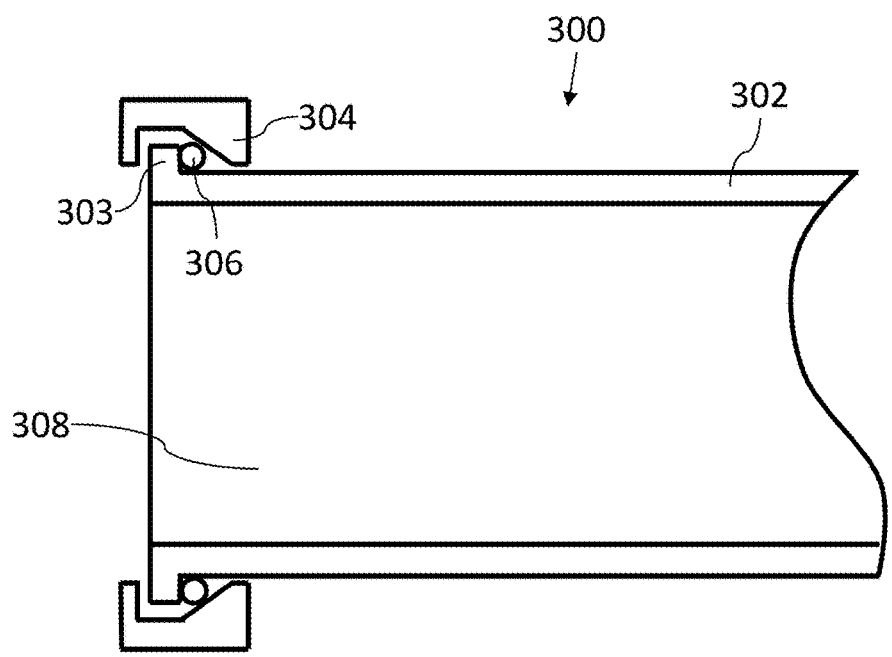
FIG. 3B illustrates a partial sectional view of an example embodiment of underwater power generation apparatus 300.

FIG. 3B illustrates a partial sectional view of an example embodiment of underwater power generation apparatus 300. As illustrated in FIG. 3B, exterior cylinder 304 may have an angled portion, that is angled relative to both the radial and axial directions of conduit 302. The angled design of exterior cylinder 304, and its interaction with at least one bearing 306, may act similar to a thrust bearing assembly.

Figure 4:
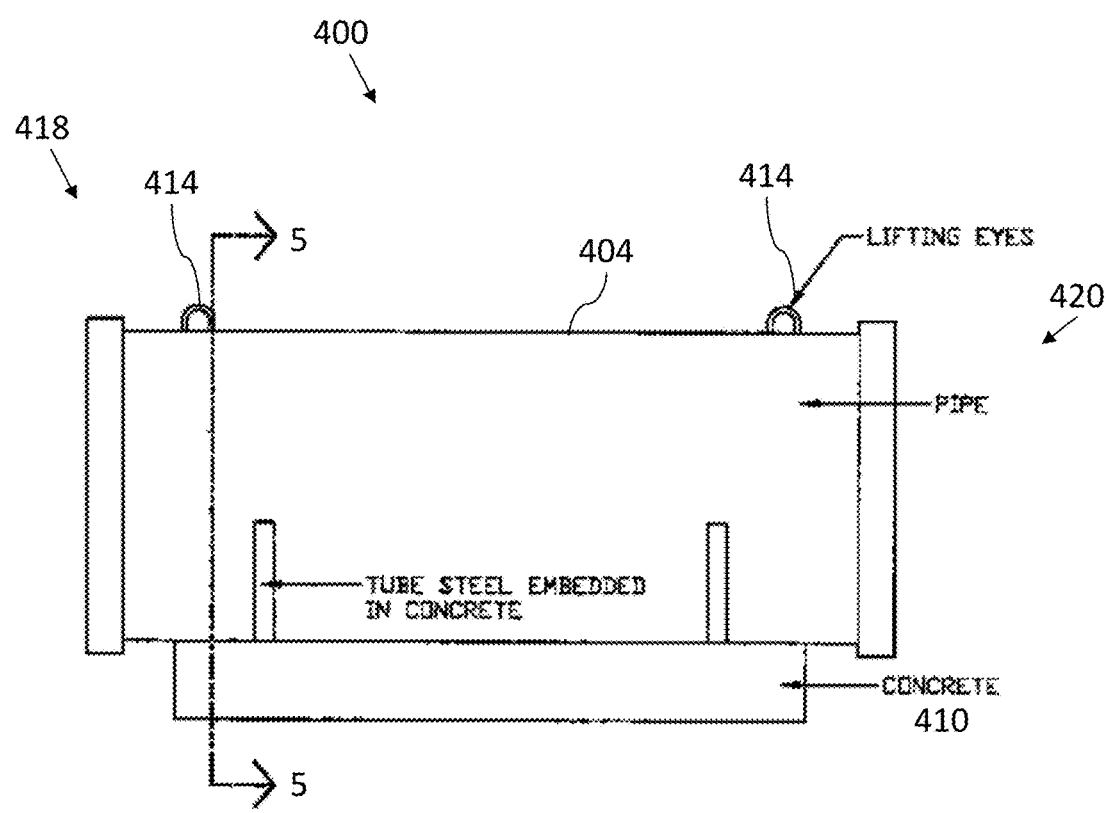
FIG. 4 illustrates a side view of an example embodiment of an underwater power generation apparatus.

FIG. 4 illustrates a side view of an example embodiment of an underwater power generation apparatus 400. Apparatus 400 may include a conduit (not shown), an exterior cylinder 404, and at least one bearing (not shown). Apparatus 400 may include a base 410. Apparatus 400 may include at least one support member 412. Apparatus 400 may include at least one lifting eye 414.

Apparatus 400 may include a first end 418 and a second end 420.

Figure 5:
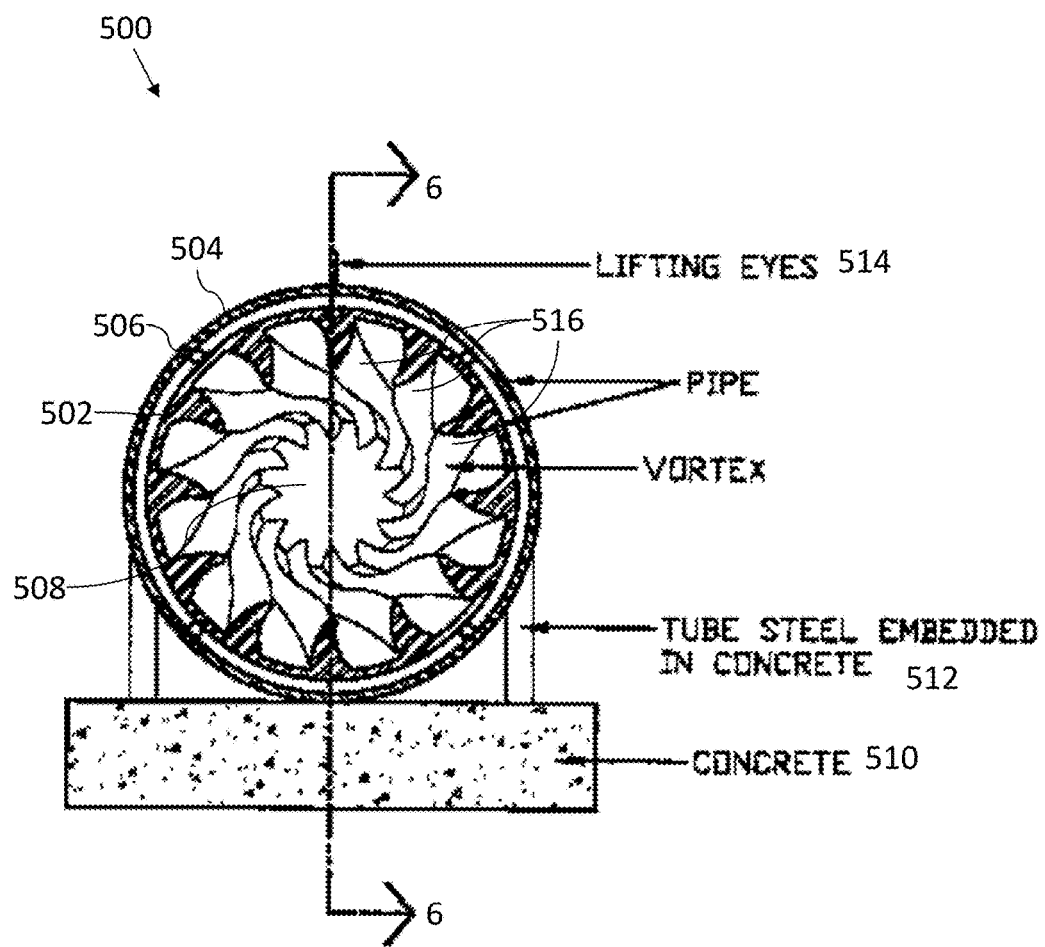
FIG. 5 illustrates a sectional view of an example embodiment of an underwater power generation apparatus taken about section 5-5 illustrated in FIG. 4.

FIG. 5 illustrates a sectional view of an example embodiment of an underwater power generation apparatus 500 taken about section 5-5 illustrated in FIG. 4. FIG. 5 illustrates a conduit 502, an exterior cylinder 504, and at least one bearing 506. Conduit 502 may include a bore 508. Apparatus 500 may include a base 510 and at least one support member 512. Apparatus 500 may include at least one lifting eye 514.

Conduit 502 may include at least one blade 516 oriented on its interior surface. At least one blade 516 may include a curved cross-section. At least one blade 516 may extend in a spiral orientation along at least a portion of the length of conduit 502. As illustrated, a flow of a fluid into bore 508 would result in rotation of conduit 502 in a counter-clockwise direction.

Figure 6:
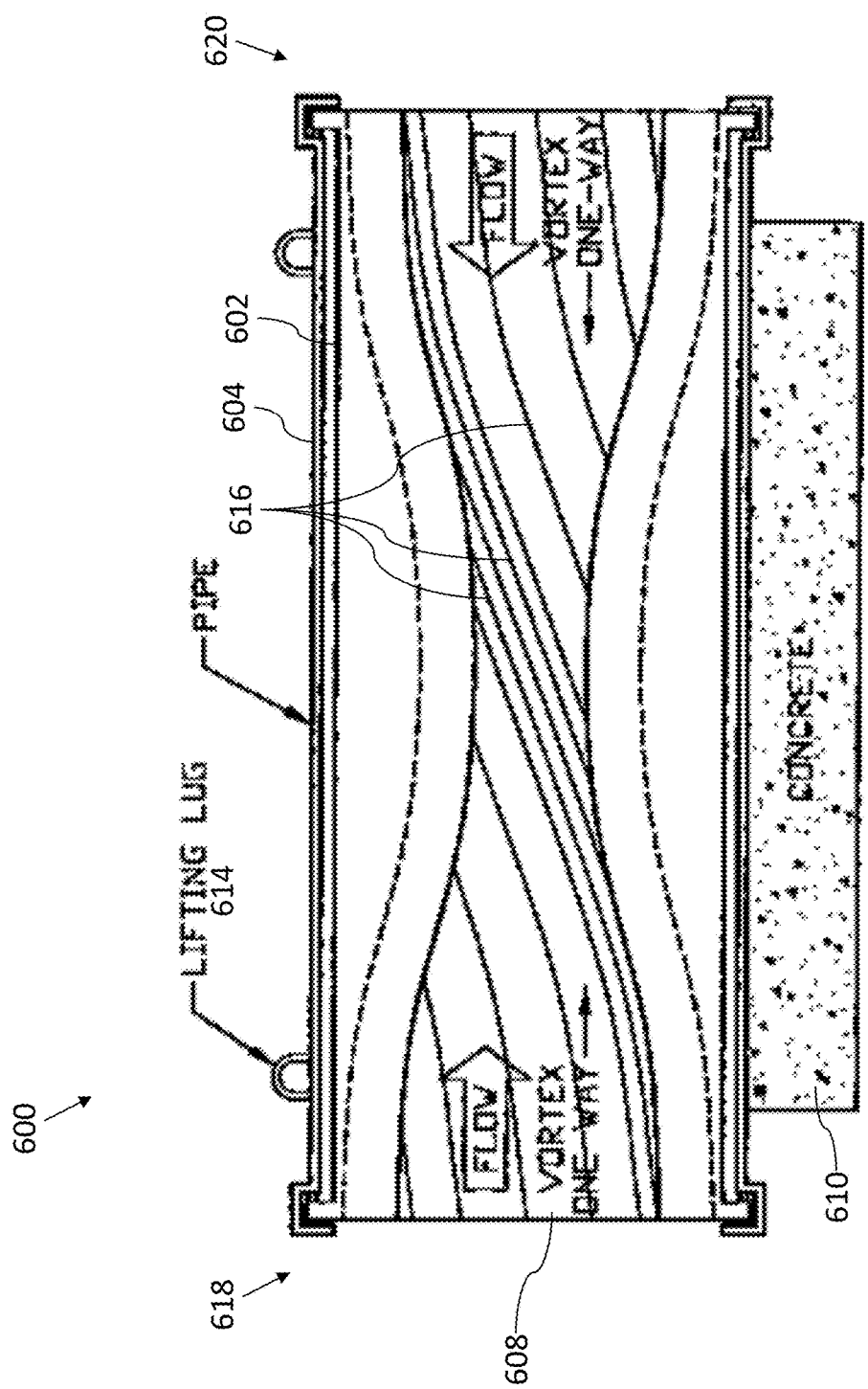
FIG. 6 illustrates a sectional view of an example embodiment of an underwater power generation apparatus taken about section 6-6 illustrated in FIG. 5.

FIG. 6 illustrates a sectional view of an example embodiment of an underwater power generation apparatus taken about section 6-6 illustrated in FIG. 5. FIG. 6 illustrates a conduit 602, an exterior cylinder 604, and at least one bearing (not shown). Conduit 602 may include a bore 608. Apparatus 600 may include a base 610. Apparatus 600 may include at least one lifting eye 614.

Apparatus 600 may include at least one blade 616 extending from a first end 618 of apparatus 600 to a second end 620. At least one blade 616 has a blade direction that is constant through the length of conduit 602.

Figure 7:
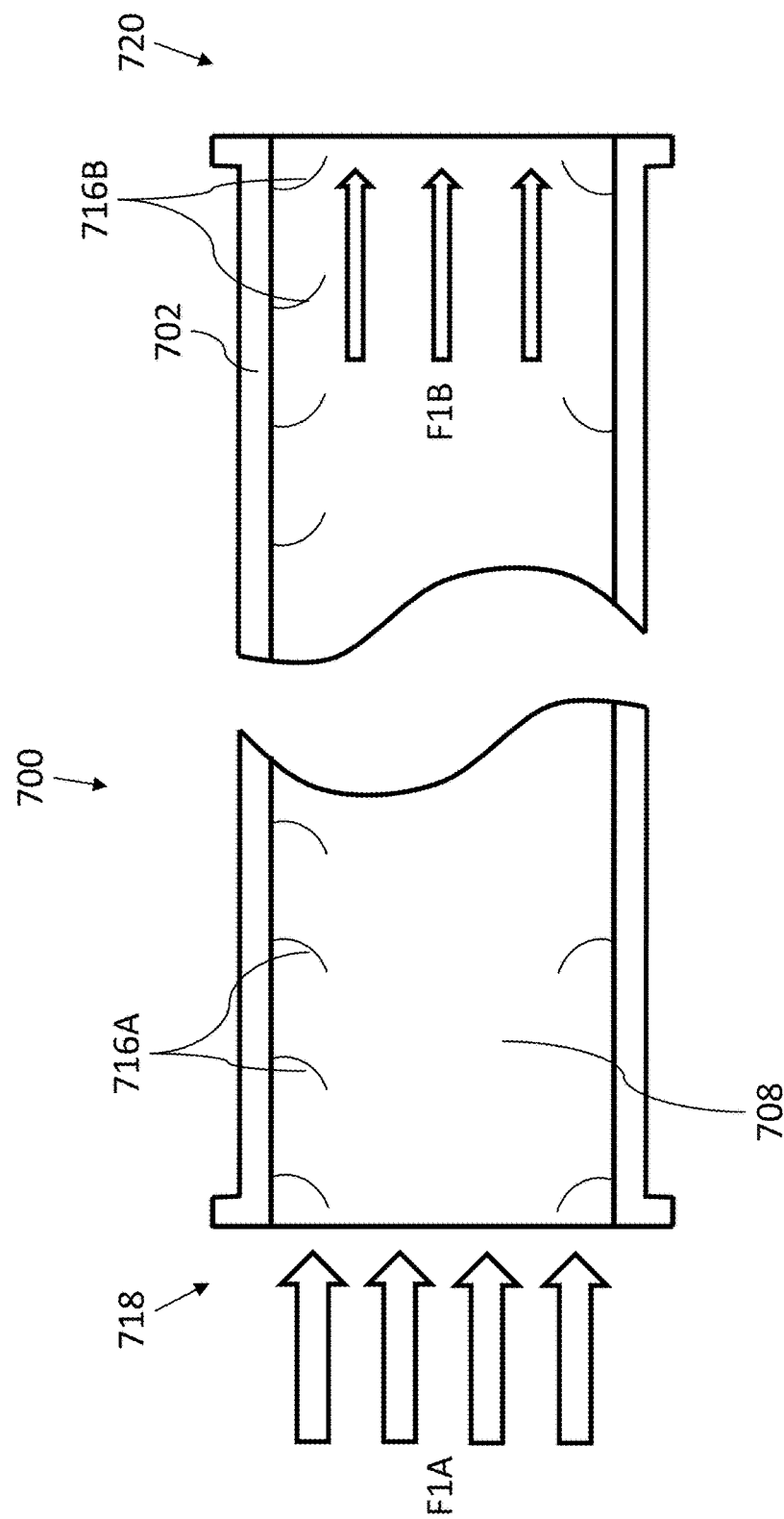
FIG. 7 illustrates a partial sectional view of an example embodiment of an underwater power generation apparatus.

FIG. 7 illustrates a partial sectional view of an example embodiment of an underwater power generation apparatus 700. Apparatus 700 may include a conduit 702, an exterior cylinder (not shown), and at least one bearing (not shown). Conduit 702 may include a bore 708, which may be a void extending about its length.

Conduit 702 may include at least one blade 716A, 716B oriented on the interior surface of conduit 702.

At least one blade 716A may be oriented in a first blade direction, having a generally curved cross-section. At least one blade 716A may be cupped toward first end 718, so as to more readily engage a flow of fluid coming from the direction of first end 718. At least one blade 716A may be cupped away from second end 720, so as to minimize engagement of a flow of fluid coming from the direction of second end 720.

At least one blade 716B may be oriented in a second blade direction, having a generally curved cross-section. At least one blade 716B may be cupped toward second end 720, so as to more readily engage a flow of fluid coming from the direction of second end 720. At least one blade 716B may be cupped away from first end 718, so as to minimize engagement of a flow of fluid coming from the direction of first end 718.

An entry fluid flow F1A may enter bore 708 from first end 718, and thus engage at least one blade 716A. Entry fluid flow F1A may pass through conduit 702 and toward second end 720. Exit fluid flow F1B may pass over at least one blade 716B without fully engaging blade 716B.

Figure 8A:
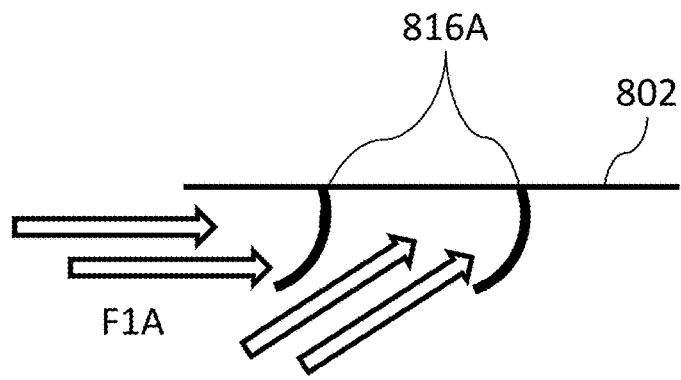
FIG. 8A illustrates a partial sectional view of an example embodiment of a plurality of blades in an underwater power generation apparatus.
Figure 8B:
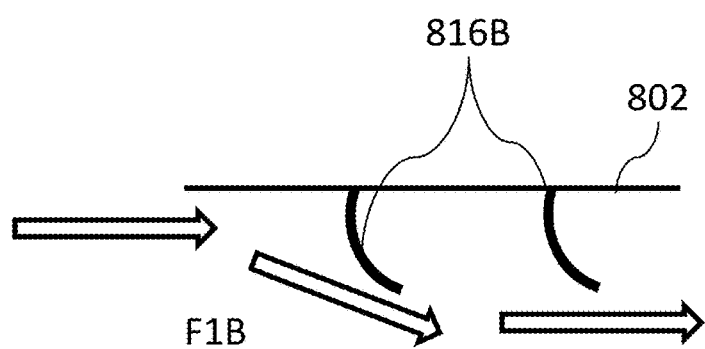
FIG. 8B illustrates a partial sectional view of an example embodiment of a plurality of blades in an underwater power generation apparatus.

FIGS. 8A and 8B illustrate a partial sectional view of an example embodiment of a plurality of blades in an underwater power generation apparatus. Blades 816A, 816B may extend from conduit 802 into a bore (not shown). Blades 816A, 816B may include a curved cross-section.

An entry fluid flow F1A may engage a cupped face of blades 816A, which cupped face causes entry fluid flow F1A to more fully engage blades 816A.

An exit fluid flow F1B may pass over a curved face of blades 816B. A flow of fluid encountering the curved face of blades 816B may be more likely to pass over blades 816B without fully engaging blades 816B.

Figure 9A:
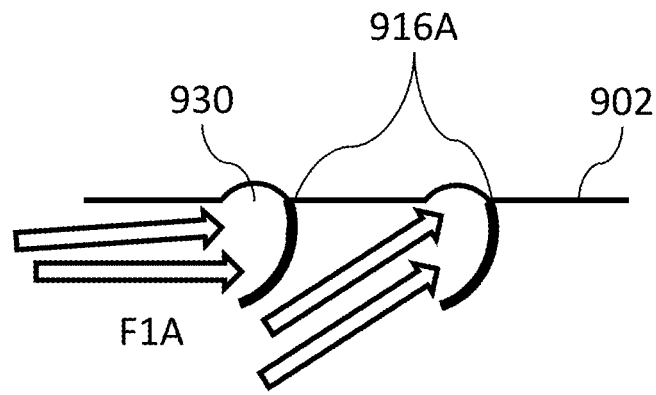
FIG. 9A illustrates a partial sectional view of an example embodiment of a plurality of blades in an underwater power generation apparatus.
Figure 9B:
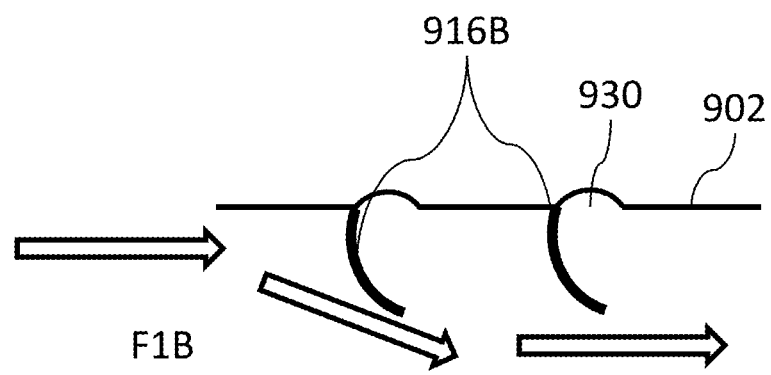
FIG. 9B illustrates a partial sectional view of an example embodiment of a plurality of blades in an underwater power generation apparatus.

FIGS. 9A and 9B illustrate a partial sectional view of an example embodiment of a plurality of blades in an underwater power generation apparatus. Blades 916A, 916B may extend from conduit 902 into a bore (not shown). Blades 916A, 916B may include a curved cross-section. A groove 930 may extend into the interior surface of conduit 902 adjacent to the concave, cupped face of blades 916A, 916B. Groove 930 may provide more concave, cupped surface area of blades 916A, 916B exposed to an entry fluid flow F1A. As illustrated, exit fluid flow F1B does not encounter groove 930, as groove 930 is shielded from exit fluid flow F1B by blade 916B. Groove 930 may be substantially helical in nature as it extends along the interior surface of conduit 902. Groove 930 may be substantially helical to match the helical nature of blade 916A, 916B as they extend along the interior surface of conduit 902.

It is contemplated that in any of the apparatuses described above, the shape of the interior of the conduit and/or the shape and orientation of the blade or blades within the conduit, may cause a vortex within the conduit. As described above, the formation of a vortex within the conduit may increase flow of fluids through the conduit.

Any of the blades referenced herein may be helical blades.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to indicate a nature of an element and/or a relationship between elements within a reasonable degree of precision and tolerance as is acceptable in the relevant field of technology. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. An underwater power generation apparatus, comprising:
   a conduit having a bore defined by an interior surface of the conduit, the bore comprising a void extending about a length of the conduit;
   an exterior cylinder,
      wherein the conduit is oriented within the exterior cylinder, and
      wherein the conduit is rotatable relative to the exterior cylinder;
   at least three bearings oriented between the conduit and the exterior cylinder, the at least three bearings comprising at least one of a ball bearing and a roller bearing;
   at least one blade having a first blade direction, the at least one blade having a first blade direction oriented on the interior surface of the conduit at a first end of the conduit; and
   at least one blade having a second blade direction, the at least one blade having a second blade direction oriented on the interior surface of the conduit at a second end of the conduit,
   wherein the at least one blade having a first blade direction has a concave surface oriented toward the first end of the conduit, and wherein the at least one blade having a second blade direction has a concave surface oriented toward the second end of the conduit and
   wherein the interior surface of the conduit further comprises a groove adjacent to the concave surface of the at least one blade having a first blade direction and the at least one blade having a second blade direction, wherein the groove increases a size of the concave surface of the at least one blade having a first blade direction and the at least one blade having a second blade direction.

2. The apparatus of claim 1, wherein the first blade direction and the second blade direction are opposite one another.

3. The apparatus of claim 1, wherein the bore is substantially hourglass-shaped, having a diameter at the first end of the conduit and the second end of the conduit, and a diameter at the central portion of the conduit, wherein the diameter at the first end of the conduit and the second end of the conduit is greater than the diameter at the central portion of the conduit.

4. The apparatus of claim 1, wherein the exterior cylinder comprises an upper section and a lower section.

5. The apparatus of claim 4, wherein the upper section and the lower section each extend about a length of the apparatus.

6. The apparatus of claim 4, wherein the upper section and the lower section each include at least one flange, and wherein the at least one flange of the upper section is selectively connected to the at least one flange of the lower section by at least one fastener.

7. The apparatus of claim 1, further comprising a base.

8. The apparatus of claim 7, wherein the base is a weighted element.

9. The apparatus of claim 7, wherein the exterior cylinder is connected to the base by at least one support member.

* * * * *